(12) United States Patent
Servida

(10) Patent No.: US 10,287,191 B2
(45) Date of Patent: May 14, 2019

(54) APPARATUS WITH FLOW-THROUGH CAPACITORS FOR THE PURIFICATION OF A LIQUID AND PROCESS FOR THE PURIFICATION OF SAID LIQUID

(71) Applicant: IDROPAN DELL'ORTO DEPURATORI S.R.L., Milan (IT)

(72) Inventor: Tullio Servida, Milan (IT)

(73) Assignee: IDROPAN DELL'ORTO DEPURATORI S.R.L., Milan (IT)

( * ) Notice: Subject to any disclaimer, the term of this patent is extended or adjusted under 35 U.S.C. 154(b) by 684 days.

(21) Appl. No.: 14/442,730

(22) PCT Filed: Nov. 15, 2013

(86) PCT No.: PCT/IB2013/002576
§ 371 (c)(1),
(2) Date: Jul. 15, 2015

(87) PCT Pub. No.: WO2014/076557
PCT Pub. Date: May 22, 2014

(65) Prior Publication Data
US 2015/0315040 A1 Nov. 5, 2015

(30) Foreign Application Priority Data

Nov. 15, 2012 (IT) .............................. PD2012A0350
Nov. 15, 2012 (IT) .............................. PD2012A0351

(51) Int. Cl.
*C02F 1/469* (2006.01)
*C02F 103/08* (2006.01)
(Continued)

(52) U.S. Cl.
CPC ........ *C02F 1/4691* (2013.01); *C02F 2101/12* (2013.01); *C02F 2103/08* (2013.01);
(Continued)

(58) Field of Classification Search
CPC ........ H01G 11/10; H01G 11/12; H01G 9/155; H01G 2009/0007; C02F 1/4691; C02F 2201/46; Y02E 60/13; H02J 7/345
See application file for complete search history.

(56) References Cited

U.S. PATENT DOCUMENTS

| 6,225,781 B1 | 5/2001 | Okamura et al. |
| 2002/0084188 A1* | 7/2002 | Tran ............... B82Y 30/00 204/551 |

(Continued)

FOREIGN PATENT DOCUMENTS

| EP | 2315342 A1 | 4/2011 | |
| IT | PD20100144 A1 * | 11/2011 | ............ C02F 1/4691 |

(Continued)

OTHER PUBLICATIONS

Alkuran M et al: "Utilization of a Buck Boost Converter and the Method of Segmented Capacitors in a CDI Water Purification System", Power System Conference, 2008. MEPCON 2008. 12th International Middle-East, IEEE, Piscataway, NJ, USA, Mar. 12, 2008, p. 470-474, XP031284958, ISBN: 978-1-4244-1933-3—The Whole Document.

*Primary Examiner* — Salil Jain
(74) *Attorney, Agent, or Firm* — Mark M. Friedman

(57) ABSTRACT

Apparatus with flow-through capacitors for the purification of a liquid, which comprises: at least one cell (2) provided with at least one flow-through capacitor (4) provided with two or more electrodes facing each other, between which a liquid to be treated is susceptible to flow; electrical power supply means (13) adapted to supply a direct supply voltage ($V_A$); a modulation circuit (14) connected in input to the electrical power supply means (13) in order to receive the supply voltage ($V_A$) and provided with switches (22', 22"; 23', 23") actuatable to apply at least one operating voltage between the facing electrodes of each capacitor (4). In (Continued)

addition, the present apparatus comprises a control circuit (24) which is connected to the switches (22', 22"; 23', 23") of the modulation circuit (14), and is provided with a control module with pulse width modulation (PWM), which drives the switching of the switches (22', 22"; 23', 23") by power supplying the facing electrodes of each capacitor (4) by means of a pulsed voltage having average value proportional to the aforesaid operating voltage.

14 Claims, 7 Drawing Sheets

(51) Int. Cl.
    *C02F 101/12* (2006.01)
    *H02J 7/00* (2006.01)
(52) U.S. Cl.
    CPC .............. *C02F 2201/46* (2013.01); *C02F 2201/46135* (2013.01); *H02J 7/0016* (2013.01)

(56) References Cited

U.S. PATENT DOCUMENTS

| | | | |
|---|---|---|---|
| 2007/0194759 A1* | 8/2007 | Shimizu | H02J 7/0016 320/166 |
| 2008/0105551 A1 | 5/2008 | Wang et al. | |
| 2009/0045048 A1* | 2/2009 | Bourcier | C02F 1/4691 204/228.1 |
| 2010/0259956 A1* | 10/2010 | Sadwick | H05B 33/0815 363/50 |
| 2013/0270116 A1* | 10/2013 | Hu | C02F 1/4691 204/661 |

FOREIGN PATENT DOCUMENTS

| | | |
|---|---|---|
| WO | 01095410 A1 | 12/2001 |
| WO | 20110138663 A1 | 11/2011 |
| WO | 20120091866 A2 | 7/2012 |

* cited by examiner

APPARATUS WITH FLOW-THROUGH CAPACITORS FOR THE PURIFICATION OF A LIQUID AND PROCESS FOR THE PURIFICATION OF SAID LIQUID

FIELD OF APPLICATION

The present invention regards an apparatus with flow-through capacitors for the purification of a liquid and a process for the purification of said liquid, according to the preamble of the relative independent claims.

The present apparatus and the process are part of the industrial field of the production of apparatuses for the purification of liquids, and are intended to be advantageously employed for removing undesired concentrations of contaminants from liquids, e.g. constituted by salts dissolved therein.

More in detail, the present apparatus and the process can be intended for multiple applications both in industrial and civil fields, such as the desalination of seawater, the softening of particularly hard waters, the removal of salts (such as chlorides and sulfides), nitrates, nitrites, ammonia, heavy metals, organic substances or micro-pollutants in general from water, or for the deionization of fluids e.g. for industrial processes or for the concentration of polluting substances that are difficult to dispose of or are advantageous to recover for a reuse.

STATE OF THE ART

The apparatuses for the purification of liquids by means of flow-through capacitors conventionally comprise one or more cells connected in series or in parallel, each provided with one or more flow-through capacitors. Each capacitor comprises a plurality of superimposed electrodes facing each other, between which a flow of a liquid to be purified containing ionized particles is made to pass, for the purpose of obtaining a solvent cleaned of such particles (whether these are ions or other charge substances depending on the specific application). More in detail, the electrodes of the flow-through capacitors are formed with one or more superimposed layers of conductor material with porous structure, such as active carbon.

The apparatus further comprises a direct current power supply connected to the electrodes of the flow-through capacitors and adapted to charge each electrode with a polarity opposite that of the electrode facing thereto in the same capacitor, in order to generate an electrostatic field between such facing electrodes aimed to attract, on the electrodes, the ionized particles present in the liquid to be purified.

More in detail, functionally, a step of charging with direct polarity is provided, in which the facing electrodes of the flow-through capacitor are charged with different charge polarity and brought to a provided operating voltage, e.g. equal to about 1.5 V; an operating step is also provided in which the flow of liquid to be treated is forced to pass through the electrodes of the capacitor thus charged. During such operating step, there is the cleaning of the liquid of the ionized particles, due to the fact that such particles are attracted by the respective electrodes with polarity opposite thereto, determining a progressive accumulation of the ionized particles on the same electrodes.

Once the programmed saturation of the electrodes has been reached with the ionized particles present in the liquid, a regeneration step is provided for, in which the electrodes are deactivated and a flow of washing liquid is forced to pass into the flow-through capacitor with ensuing removal of the ionized particles accumulated on the electrodes.

More in detail, the regeneration step provides for a step of discharge with short-circuiting of the electrodes, a step of charging with reversed polarity, in which the electrodes are subjected to a voltage with reversed polarity aimed to move the ionized particles away from the electrodes on which they had accumulated, and possibly a further step of discharge before restarting the subsequent charging and operating steps.

Such flow-through capacitors, in direct current conditions, typically have very high capacitances, e.g. on the order of more than 20000 F, and therefore during their operation they accumulate a high quantity of charge therein.

The apparatuses of known type are conventionally provided with a control circuit connected to the current power supply and to the capacitors in order to control the polarity of the voltages applied to the electrodes of the capacitors during the operating steps. Such control circuit is for example configured with a H-bridge connected at its input terminals to the output of the direct current power supply in order to receive the 1.5 V DC operating voltage therefrom, and connected at its output terminals with a corresponding flow-through capacitor to which the aforesaid operating voltage is applied in a controlled manner according to the aforesaid operating and regeneration steps.

In particular, the direct current power supply of the apparatus comprises an AC/DC converter connected at its input terminals to an alternating current electrical power supply source (e.g. at 220 V 50 Hz), adapted to supply a direct supply voltage to its output terminals generally comprised between 5 and 24 V.

In addition, the power supply comprises a further DC/DC converter connected to the output terminals of the AC/DC converter in order to receive the aforesaid direct supply voltage, and connected to the input terminals of the H-bridge of the control circuit in order to supply the latter with the 1.5 V operating voltage.

More in detail, the DC/DC converter of the current power supply is of "buck" type and comprises, in a manner known to the man skilled in the art, two switches constituted by two MOSFETs configured as a half-bridge (including a high MOSFET connected to the positive output terminal of the first converter and a low grounded MOSFET) and connected to an LC filter. Functionally, as is known, the two MOSFETs are cyclically actuated by closing, for a first period $T_{on}$, the high MOSFET (with the low MOSFET open) in order to charge the inductance of the LC filter, and subsequently by closing, for a second period $T_{off}$, the low MOSFET (with the high MOSFET open) in order to discharge such inductance on the capacitor of the same LC filter.

In this manner, the LC filter is power supplied with a square wave voltage whose duty cycle (ratio between first interval $T_{on}$, and period of the square wave $T_{on}+T_{off}$) corresponds with the ratio between the output voltage and the input voltage of the DC/DC converter. Therefore, by setting a suitable value of the duty cycle, it is possible to obtain an output voltage of LC filter equal to the value of 1.5 V desired for the operating voltage applied to the H-bridge that controls the polarity of the corresponding flow-through capacitor.

Some examples of apparatuses of known type having the abovementioned characteristics are described in the patents EP 2315342 and WO 2012/091866.

A first drawback of the apparatus for the purification of liquids of the above-described type lies in the fact that the high capacitance of the flow-through capacitors requires the arrangement of power supply units capable of operating with very high direct electric currents in order to charge the electrodes during the step of charging with direct polarity and with reversed polarity, and therefore such power supply units are complex and costly.

In addition, the need to generate high electric currents involves high heat dissipation on the electrical components, with the need to arrange numerous and bulky metal dissipation fins, with a consequent increase of the structural complexity and cost of the apparatus.

A further drawback of the apparatus for the purification of liquids of the above-described type lies in the fact that the DC/DC converter is easily subject to failure, in particular in the case in which, when the polarity reversal of the capacitor is executed between the regeneration step and the operating step, the flow-through capacitor has a residual negative voltage between its electrodes. This occurs, for example, because at the end of the regeneration step or operating step, the flow-through capacitor was not short-circuited for a sufficiently long time, or due to the interruption of the electrical power supply.

More in detail, in such situation the negative voltage at the ends of the low MOSFET of the DC/DC converter brings the low MOSFET itself into conduction, short-circuiting the high MOSFET to the ground. Therefore, when the high MOSFET is closed, it has, applied between its drain and source terminals, substantially the entire direct supply voltage supplied in output by the AC/DC converter; this causes the passage, through the MOSFETs, of a very high current, higher than the maximum drain current that can be applied to the MOSFETs themselves, causing a high heating thereof due to the excessive current, with ensuing failure of the MOSFETs.

In order to at least partly resolve this drawback, it is known to arrange resistors in series with the flow-through capacitors in order to reduce the current which flows through the MOSFETs of the DC/DC converter. Nevertheless, such expedient does not at all reduce the current that passes through the high MOSFET of the DC/DC converter, since the low MOSFET of the latter determines a short-circuit that is upstream of the resistors associated with the flow-through capacitors, with ensuing failure of the high MOSFET due to the passage of excessive current.

In addition, the resistors in series with the flow-through capacitor limit the short-circuit current that passes through the capacitor itself during the regeneration step, slowing the removal of the ionized particles from the liquid that passes between the electrodes of the capacitors, with ensuing low efficiency in terms of purification of the liquid itself.

Apparatuses with flow-through capacitors in which the capacitors of each cell are connected in series with each other, in order to be able to power supply such capacitors by applying, to the ends of such series of capacitors, a direct operating voltage that is higher with respect to the case in which the cell comprises only one capacitor or multiple capacitors in parallel are also widely available in the market. Thus, such apparatuses of known type allow employing power supplies which supply a relatively high direct voltage in output and which are structurally simple and hence economically available in the market.

The main drawback of the latter apparatuses of known type, provided with multiple capacitors connected in series, lies in the fact fact that they are not capable of precisely determining the operating voltage at the ends of each capacitor, with ensuing inefficiency in the purification of the liquid (in case of too low operating voltage), or energy waste (in the case of too high operating voltage).

Such drawback is due to the fact that the actual capacitance of a flow-through capacitor significantly depends on various structural factors (such as the density of distribution of the active carbon on each electrode) which are not precisely controllable in the step of production of the capacitor itself. This means that the actual capacitance of a capacitor may considerably vary from the nominal design value, and thus cannot be accurately determined beforehand. For such reason, multiple flow-through capacitors having the same nominal capacitance value typically have, in practice, actual capacitances that are different from each other. Therefore, when such capacitors are connected in series, the voltage between the electrodes of a capacitor being inversely proportional to the capacitance of the latter given the same charge, the capacitors that have high actual capacitance are subjected to lower voltage, with differences between the voltages of the different capacitors of even 30% with respect to each other.

In order to at least partly resolve such drawback, an apparatus of known type is known, described in the patent application WO 01/95410, which provides for a control unit adapted to adjust the voltage applied to each capacitor by varying the flow of the liquid that passes through the capacitor itself.

In addition, the apparatus described in the patent application WO 01/95410 provides for connecting, in parallel to each cell, a MOSFET polarized in the linear region in order to adjust the voltage applied to the ends of the cell itself. More in detail, the control unit for the apparatus controls the voltage at the gate terminal of the MOSFET so as to adjust, as is known to the man skilled in the art, the resistance in conduction of the MOSFET in the linear region, and therefore the voltage between the drain and source terminals of the MOSFET, such voltage coinciding with the voltage applied to the terminals of the cell.

A first drawback of the apparatus described in the patent application WO 01/95410 is due to the fact that the adjustment of the voltage applied to the ends of the capacitors, by means of the variation of the speed of the flow of the liquid that passes through the capacitors themselves, requires the arrangement of numerous control valves for the hydraulic plant and complex electronics for driving such valves, with an ensuing considerable structural complexity of the apparatus, which involves high costs for the production thereof.

In addition, the arrangement of the MOSFET, connected in parallel to each cell and polarized in linear region, involves considerable energy dissipation, since the MOSFET in the linear operation region has relatively high resistance in conduction, in this manner leading to low energy efficiency of the apparatus.

PRESENTATION OF THE INVENTION

In this situation, the problem underlying the present invention is therefore that of eliminating the problems of the abovementioned prior art, by providing an apparatus with flow-through capacitors for the purification of a liquid and a process for the purification of a liquid which are capable of removing, with high efficiency, the ionized particles from the aforesaid liquid to be treated.

A further object of the present invention is to provide an apparatus with flow-through capacitors for the purification of a liquid that is entirely reliable in operation, and in particular capable of functioning without overheating the electrical and electronic components of the apparatus itself.

A further object of the present invention is to provide an apparatus with flow-through capacitors for the purification of a liquid that is structurally simple and inexpensive to achieve.

A further object of the present invention is to provide an apparatus with flow-through capacitors for the purification of a liquid which allows limiting energy consumption.

A further object of the present invention is to provide an apparatus with flow-through capacitors for the purification of a liquid that is entirely reliable in operation.

BRIEF DESCRIPTION OF THE DRAWINGS

The technical characteristics of the invention, according to the aforesaid objects, can be clearly found in the contents of the below-reported claims and the advantages thereof will be clearer from the following detailed description made with reference to the enclosed drawings, which represent several merely exemplifying and non-limiting embodiments of the invention, in which:

DETAILED DESCRIPTION OF A PREFERRED EMBODIMENT

With reference to the attached drawings, reference number 1 indicates an apparatus with flow-through capacitors for the purification of a liquid, object of the present invention, in its entirety.

The apparatus 1, according to the invention, is adapted to being employed for the purification of liquids of ionized particles present therein that are susceptible to be affected by the presence of an electric field, such as ions in solution.

Hereinbelow, the term 'ionized particles' will generically indicate any contaminant dissolved in the liquid to be treated capable of being attracted by an electrostatic field, in particular such as the ions dissolved in a liquid.

The apparatus is therefore adapted to operate for the deionization of liquids of industrial processes and for the deionization of water, in particular for softening water from the supply system and for the desalination of seawater, in particular being capable of removing the following from its interior: salts in solution (such as chlorides and sulfides), nitrates, nitrites, ammonia, and other polarized contaminants of organic substances or micro-pollutants in general.

The apparatus is further adapted to concentrate ionized particles within liquids, particularly of industrial processes, in order to facilitate the recovery or the disposal of such particles.

Figure 1:
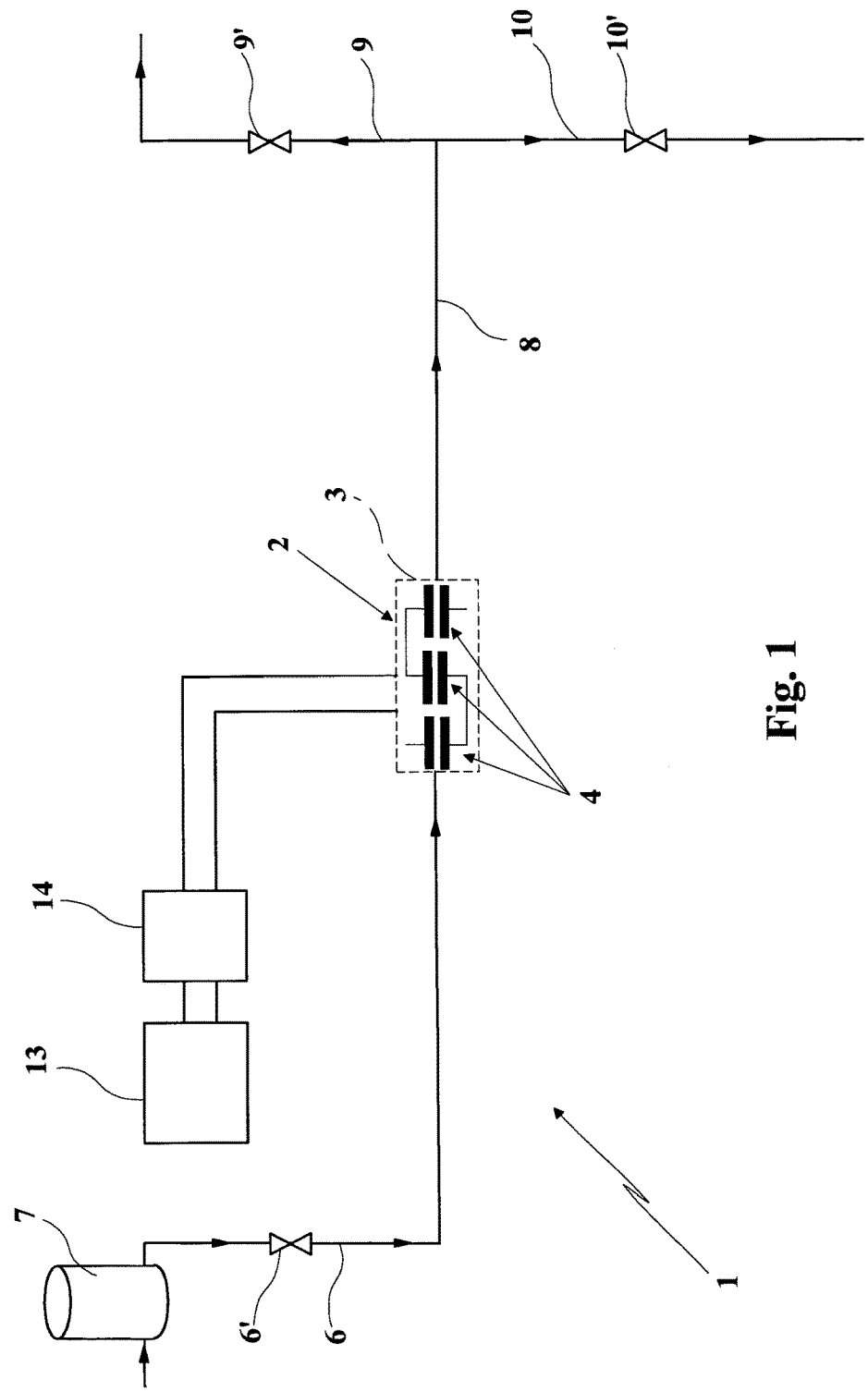
FIG. 1 shows an example of a hydraulic scheme of an apparatus for the purification of a liquid according to the present invention.

In accordance with the embodiment illustrated in FIG. 1, the present apparatus 1 comprises at least one cell 2 provided with a containment structure 3 with one or more flow-through capacitors 4 housed therein and electrically connected to each other in series or in parallel. Each capacitor 4 is in turn provided with two or more superimposed electrodes, two-by-two facing each other, preferably with thin or flat form, or wound for example to form a cylinder.

Between the electrodes, a flow of a liquid to be treated containing ionized particles is susceptible to flow, by means of a hydraulic plant described in detail hereinbelow.

Advantageously, the cell 2 comprises at least two capacitors 4 (and in particular three capacitors 4, in accordance with the embodiments illustrated in the enclosed figures) electrically connected to each other in series.

In accordance with a different, not illustrated embodiment, the cell can also comprise more than three capacitors in series, or a single capacitor, or otherwise multiple capacitors in parallel, without departing from the protective scope of the present patent.

In particular, the electrodes of each capacitor 4 are obtained with one or more superimposed layers of conductor material, such as active carbon, preferably with porous structure or with a formation of surface pores that offer a considerable exchange surface with the liquid to be treated.

More in detail, the material that constitutes the conductor layers can be any one material commonly known to be used in the electrochemical processes of the flow capacitors and will conventionally comprise, as stated above, spongy active carbon, or it can be constituted by any one of the materials described for example in patent U.S. Pat. No. 6,413,409 enclosed here for reference purposes, from line 64 of column 3 to line 41 of column 4, or by flexible PTFE conductive sheets and carbon particles as described in patent U.S. Pat. No. 7,175,783 enclosed here for reference purposes, or by any one material described in patent U.S. Pat. No. 6,709,560, enclosed here for reference purposes, from line 26 of column 6 to line 23 of column 7.

Preferably, the facing electrodes of each capacitor 4 are separated from each other by separator layers, within which the flow of liquid to be treated flows, such fluid containing the ionized particles that one wishes to at least partly remove.

In particular, such separator layers can for example be constituted by high porous, non-conductive materials, capable of isolating the electrodes, allowing the passage of the flow of liquid, such as a porous synthetic material or other non-conductive materials such as glass fiber or a nylon fabric.

The size, the shape and the distribution of the layers of conductor material that constitute the electrodes, i.e. the size, the shape and the distribution of the layer of separator material interposed between the electrodes do not form the object of a specific claim, and will not be described in detail since they are well known to those skilled in the art; merely by way of example, they are described in patent U.S. Pat. No. 6,413,409 or in patent U.S. Pat. No. 6,709,560, enclosed here for reference purposes, in particular from line 11 to line 23 of column 7.

With reference to the merely exemplifying embodiment illustrated in FIG. 1, the apparatus 1 comprises, as stated above, a hydraulic plant which is provided with a supply pipe 6 which draws, by means of the opening of a corresponding first shut-off valve 6', the liquid to be treated from a source 7 and conveys it to a cell 2; the hydraulic plant is also provided with an extraction pipe 8 which receives the flow of treated liquid exiting from the cell 2.

More in detail, the extraction pipe 8 comprises an operating branch 9 which, by means of the opening of a corresponding second shut-off valve 9', conveys the liquid treated by the cell 2 and having a low concentration of ionized particles downstream of the hydraulic plant towards a use destination, during a provided operating step of the cell 2; in addition, the extraction pipe 8 comprises a evacuation branch 10 which, by means of the opening of a corresponding third shut-off valve 10', conveys a discharge flow having a high concentration of ionized particles, during a provided regeneration step in which a washing liquid is passed through the capacitors 4 of the cell 2 in order to remove the ionized particles accumulated on their electrodes during the preceding operating step, as described in detail hereinbelow. In particular, the washing liquid employed in the regeneration step can be constituted by the same liquid to be treated coming from the source 7.

The apparatus 1 can nevertheless have hydraulic plants different from that represented in the enclosed figures for power supplying the cell 2 and the obtainment of the operating and regeneration steps, without departing from the scope of the present patent. For example it can be provided to power supply the cell 2 by means of the water supply system without requiring a tank, or the presence of a storage tank can be provided for the washing liquid to be employed in the regeneration step.

Advantageously, the cell 2 of the apparatus 1 is provided with a first and a second connection terminal 2', 2" through which the cell 2 is electrically power supplied for charging the facing electrodes of each capacitor 4 with different charge polarities, in a manner so as to generate electric fields between the electrodes themselves for the attraction of the ionized particles of the liquid to be purified which traverses the cell 2 itself, as will be clarified hereinbelow.

Figure 2:
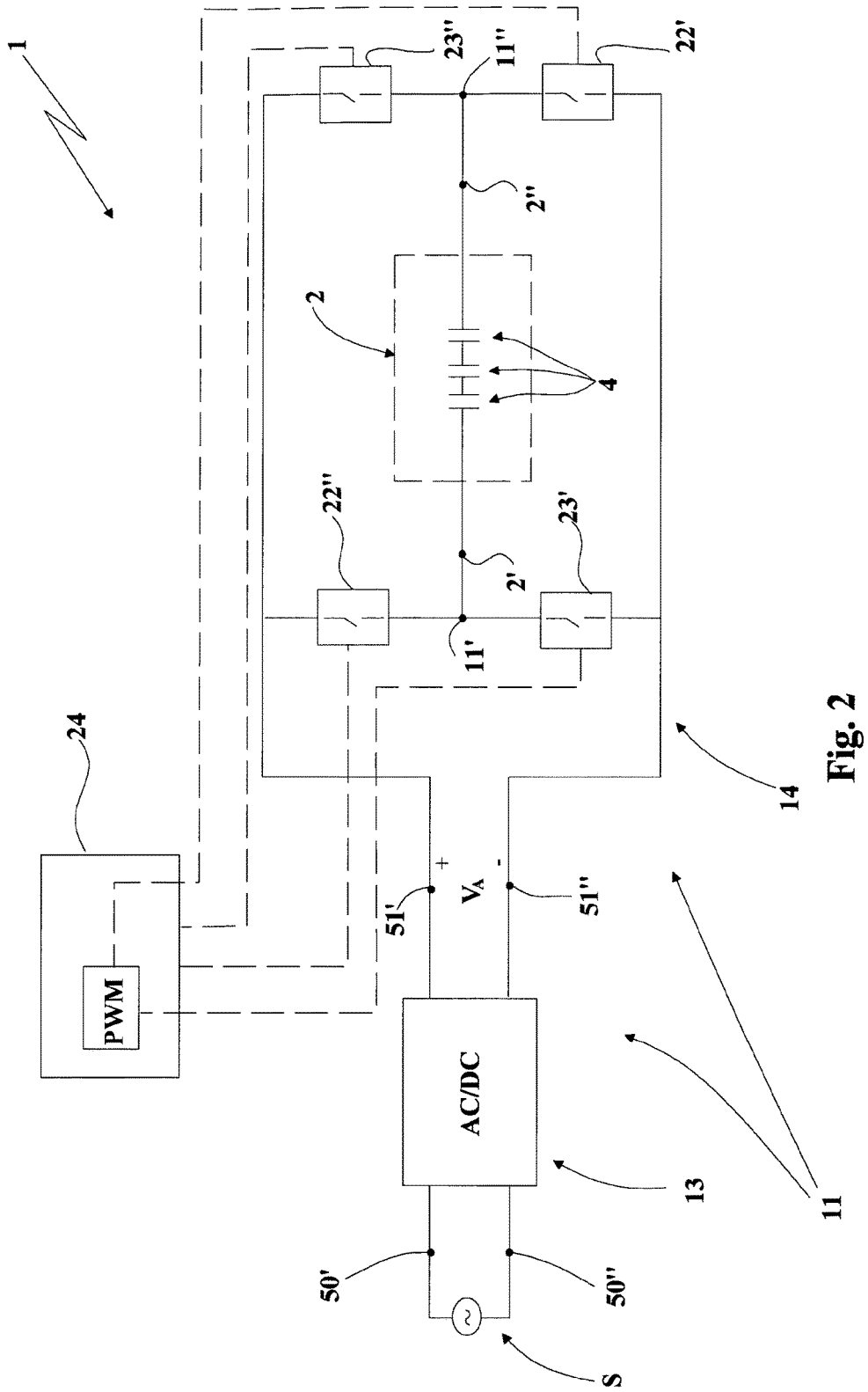
FIG. 2 shows an example of a circuit diagram for the power supply of a cell of the apparatus illustrated in FIG. 1.

According to the invention, with reference to a first embodiment illustrated in FIG. 2, the present apparatus 1 comprises electrical power supply means 13 adapted to supply a direct supply voltage $V_A$, and a modulation circuit 14, which is connected to the electrical power supply means 13 in order to receive the aforesaid supply voltage $V_A$, is connected to the connection terminals 2', 2" of the cell 2 and is provided with at least one switch 22', 22", 23', 23" actuatable to apply pre-established operating voltages between the facing electrodes of each capacitor 4, such voltages being adapted to charge the pairs of facing electrodes with charges of opposite sign.

In accordance with the idea underlying the present invention, the apparatus 1 comprises an electronic control circuit 24 connected to the aforesaid at least one switch 22', 22", 23', 23" of the modulation circuit 14, and provided with a control module with pulse width modulation PWM which drives the switching of the switch 22', 22", 23', 23" to power supply the facing electrodes of each capacitor 4 with at least one pulsed voltage having average value equal to the aforesaid operating voltage to be applied between the facing electrodes themselves.

Therefore, the modulation circuit 14 controlled by the control module PWM of the control circuit 24 advantageously constitutes a pulsed voltage generator adapted to apply the aforesaid pulsed voltage to the electrodes of the capacitor 4.

In other words, therefore, according to the idea underlying the present invention the apparatus 1 comprises:

- a control circuit 24 connected to at least one switch 22', 22", 23', 23" of a modulation circuit 14 electrically connected in input to electrical power supply means 13 in order to receive a supply voltage $V_A$, and provided with a control module with pulse width modulation PWM, which drives the switching of said switch 22', 22", 23', 23";
- a flow-through capacitor 4 of a cell 2, electrically connected to the electrical power supply means 13 through the switch 22', 22", 23', 23", having a pulsed voltage between its facing electrodes with average value proportional to the operating voltage and associated with the switching of the switch 22', 22", 23', 23" driven by the control module PWM of said control circuit 24.

Advantageously, the control circuit 24, which preferably comprises an electronic circuit board provided with CPU, is programmed with operating instructions for the control module PWM which enable the latter to activate switch 22', 22", 23', 23" to apply the aforesaid pulsed voltage, having average value proportional to the operating voltage, to the facing electrodes of the capacitor 4.

Substantially, the control circuit 24 modulates the width of the pulses of the pulsed voltage applied to the electrodes of each capacitor 4. This generates an electric field between the electrodes of the capacitor 4 capable of efficiently attracting the ionized particles present in the liquid towards the electrodes with polarity opposite thereto. Such surprising effect is described in detail hereinbelow.

As is known in the technical field of reference of the present invention, the flow-through capacitors have an equivalent capacitance at very high direct current, on the order for example of 20000 F, which is determined by the double layer of the ion particles which is created between the active carbon of the electrodes of the flow-through capacitor and the liquid present in the capacitor.

As is known, it is normally deemed that the voltage at the ends of a capacitor is given by the formula $\Delta V = I*\Delta t/C$ where $\Delta V$ is the voltage, I is the intensity of the current, $\Delta t$ is the interval of application of the voltage, and C is the capacitance of the capacitor.

By applying a pulsed current (hence for very short time intervals) to a capacitor with high capacitance, there should be detected a very small voltage variation at the ends thereof for each pulse, given by the above-mentioned formula. Actually, it is deemed that the capacitor, on the basis of the abovementioned general formula, tends to oppose variations of its charge and hence to maintain the voltage at its ends unvaried; hence, specifically with regard to quick pulsed current variations, it reacts with a very low voltage variation due to its high capacitance and thus due to the high accumulated charge.

This theoretical circumstance would make it difficult to charge and control the charge of the flow-through capacitors with pulsed voltages, since the direct voltage power supply units—whether with constant current, constant voltage or with constant voltage with current limitation—always have an internal resistance that would limit the maximum deliverable current (and hence the maximum deliverable power) and would limit the transfer of charge (and hence of power) towards the capacitor, thus drastically limiting the efficiency of the charge process.

Contrary to to the aforedescribed, it has been surprisingly observed that at the ends of the capacitor, a high voltage pulse is instead detected actually limiting the intensity of current delivered by the power supply and which progressively allows the transport of charge on the electrodes of the capacitor in an efficient manner.

Indeed, it has also been surprisingly observed that in the above-exemplified power supply conditions, at the ends of the flow-through capacitor, a voltage with square waveform is detected with peak equal to the supply voltage $V_A$ supplied by the electrical power supply means 13.

For example, by applying, to a capacitor with 20000 F capacitance, a power supply with constant voltage and limited current, e.g. pulses on the order of 100 A at about 100 Hz (thus with time intervals on the order of 10 ms), one observes high voltage peaks at the ends of the capacitor.

The presence of the voltage square wave is due to the fact that the application of a pulsed voltage to the ends of a flow-through capacitor determines, in pulsed conditions, a reduction of the capacitance of the latter, since the mobility of the ionized particles in the liquid is significantly lower than the variation speed of the pulsed voltage applied to the capacitor.

More clearly, the ionized particles, not being able to follow the variable electric field generated by such pulsed voltage, react only to the average value of the pulsed voltage and consequently are moved towards the electrodes of opposite polarity, in a manner entirely analogous to the application of a direct voltage. Substantially, the ionized particles are therefore subjected to the same action that would cause a constant electric field generated by a direct operating voltage equal to the average value of the pulsed voltage. Functionally, therefore, for the purposes of the apparatus, object of the present invention, the action of the electric field determined by the pulsed voltage applied to the ends of the capacitor attracts the ionized particles of the liquid to be treated towards the electrodes charged with polarity opposite that of the particles themselves, in this manner determining the cleaning of the liquid itself.

Advantageously, the application to the ends of the flow-through capacitor 4 of pulsed voltages with square waveform, which have a leading edge of the pulse with extremely high variation speed (theoretically infinite), determines variations of the variable electric field between the electrodes of the capacitor 4 having speeds much greater than the mobility of the ion particles of the liquid to be treated, further facilitating the aforesaid effect of the reduction of the capacitance of the flow-through capacitor 4.

The apparatus 1, object of the present invention, which provides for applying pulsed voltages to the ends of the flow-through capacitor 4 controlling the switching of the switch 22', 22", 23', 23" of the modulation circuit 14 by means of the control module with pulse width modulation PWM of the control circuit 24, is distinguished from the apparatuses of known type considered in the discussion of the state of the art; the known apparatus provide for controlling, by means of modulation of the pulse width, the DC/DC converter placed between the direct current power supply and the capacitors of the cell, and that therefore, by means of such DC/DC converter, they apply a direct (and non-pulsed) voltage to the capacitors of the cell, with the consequent drawbacks discussed above.

Figure 3:
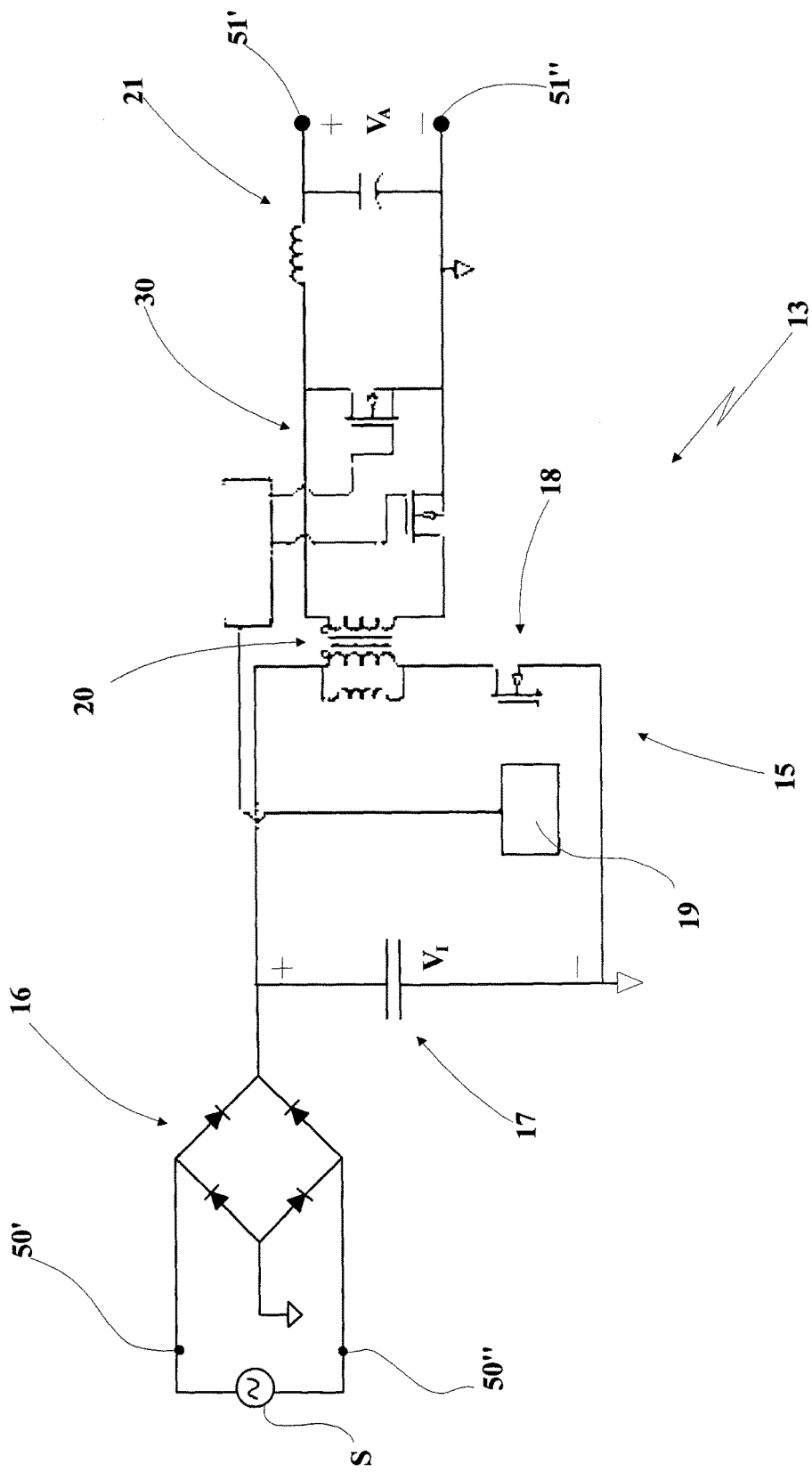
FIG. 3 shows a circuit diagram of a detail of the apparatus represented in FIG. 2 relative to the electrical power supply means.

Advantageously, with reference to the embodiment illustrated in FIG. 3, the electrical power supply means 13 of the apparatus 1 comprise an AC/DC converter 15 connected, at the input terminals thereof 50', 50", to an electrical energy source S with alternating current, and connected at the output terminals thereof 51', 51" to the modulation circuit 14. Functionally, the AC/DC converter 15 is adapted to convert an alternating voltage (e.g. at 220 V 50 Hz) supplied by the electrical source S into the direct supply voltage $V_A$ which is applied, by means of the output terminals 51', 51", to the modulation circuit 14.

More in detail, preferably, the AC/DC converter 15 comprises (in a manner per se known to the man skilled in the art and hence not described in more detail hereinbelow) a first rectifier 16 connected in input to the electrical energy source S and connected in output to a filtering capacitor 17, in order to convert the alternating voltage (supplied by the source S) into a direct input voltage $V_I$ applied to the ends of the filtering capacitor 17 itself. The latter is connected to a drive switch 18 actuated to be opened and closed with a specific frequency by an electronic circuit board 19 for controlling the AC/DC converter 15, in order to supply a first high-frequency alternating voltage to the primary of a transformer 20. The transformer 20 supplies, on its secondary, a second high-frequency alternating voltage having actual value proportional to that of the first alternating voltage on the primary. The secondary of the transformer 20 is connected to a second synchronous rectifier 30 which in turn is connected in cascade to an output LC filter 21 in a manner such to convert the alternating second voltage into the direct supply voltage $V_A$ that is supplied to the modulation circuit 14 connected to the cell 2 of the apparatus 1.

Advantageously, the direct supply voltage $V_A$ that is supplied in output by the electrical power supply means 13 has a value comprised between 12 V and 3 V and, preferably in accordance with a particular embodiment, has a value of about 5 V.

Figure 4:
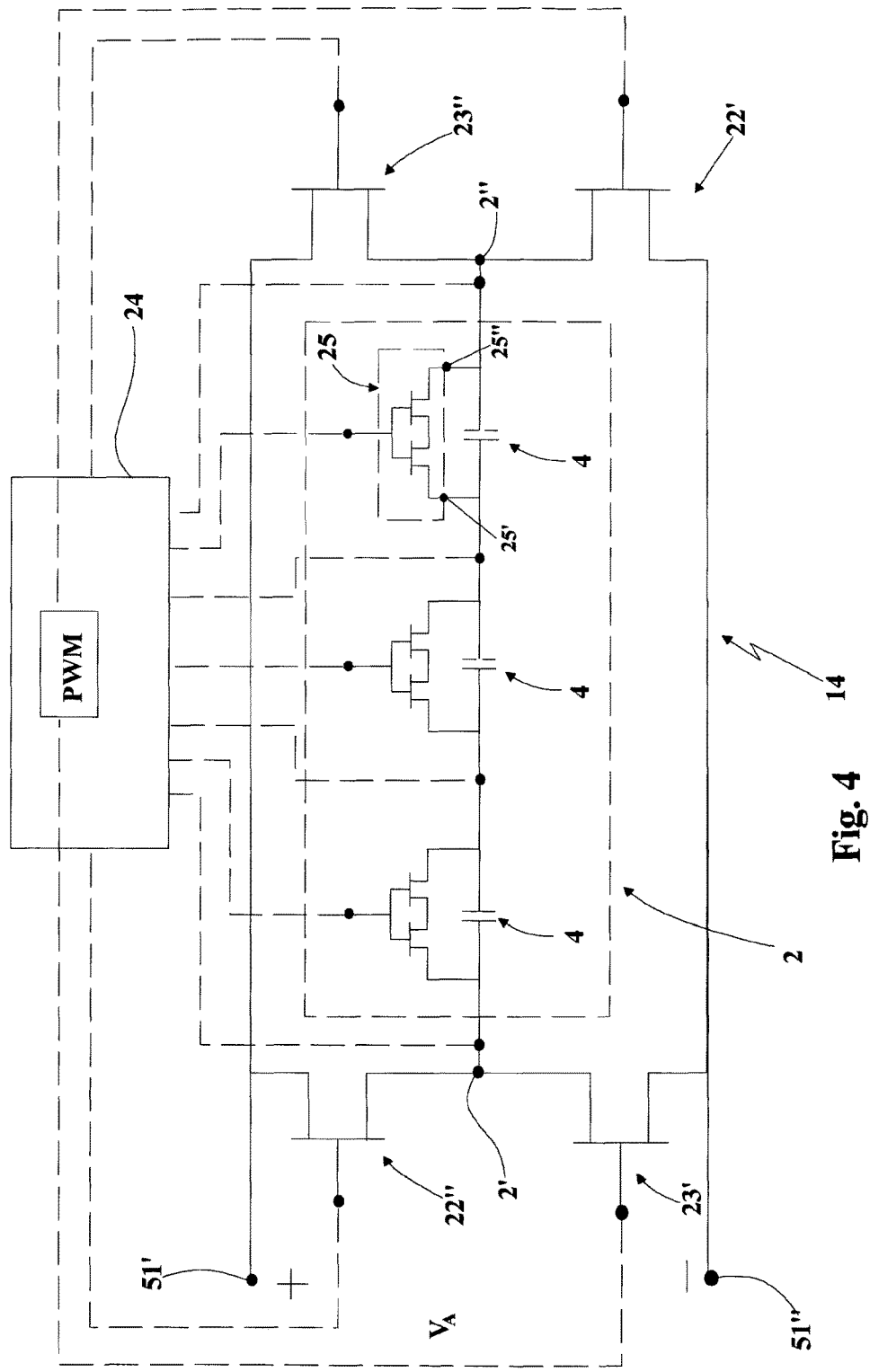
FIG. 4 shows a circuit diagram of a further detail of the apparatus represented in FIG. 2, relative to the control circuit for the operating voltages applied to the electrodes of a cell.

Advantageously, with reference to the embodiment illustrated in FIGS. 2 and 4, the modulation circuit 14, which applies the operating voltages to the cell 2, comprises a H-bridge, which is electrically connected in input to the electrical power supply means 13 in order to receive the aforesaid supply voltage $V_A$, and is electrically connected in output to the capacitors 4 of the cell 2 through the connection terminals 2', 2" of the latter. In addition, the H-bridge is provided with two pairs of switches 22', 22" e 23', 23" of the modulation circuit 14, actuatable in order to alternately apply operating voltages with opposite polarity between the facing electrodes of each capacitor 4.

In accordance with the particular embodiments illustrated in the enclosed figures, in which the cell 2 comprises multiple capacitors 4 in series, the voltage applied by the modulation circuit 14 to the connection terminals 2', 2" of the cell 2 is substantially equal to the sum of the operating voltages of each capacitor 4 of the cell 2 itself.

Otherwise, in the case in which the cell comprises only one capacitor, or multiple capacitors connected in parallel, the operating voltage applied to each capacitor coincides with the voltage applied by the H-bridge to the connection terminals of the cell.

Advantageously, in accordance with the embodiment illustrated in FIGS. 2 and 3, the H-bridge of the modulation circuit 14 comprises a first pair of switches 22', 22" actuatable for applying, between the facing electrodes of each capacitor 4, a first pulsed voltage susceptible to attract the ionized particles of the liquid to be treated on the electrodes themselves during the operating step of the cell 2, and a second pair of switches 23', 23" actuatable for applying, between the facing electrodes, a second pulsed voltage having average value with polarity opposite the average value of the aforesaid first pulsed voltage, and susceptible to move the ionized particles away from the electrodes during the regeneration step of the cell 2.

In the embodiment described in the present document, it is conventionally deemed that, during the operating step, the first connection terminal 2' of the cell 2 is subjected to a greater potential than the potential of the second connection terminal 2", whereas in the regeneration step the first connection terminal 2' is subjected to a lesser potential than the second connection terminal 2". Obviously, the first connection terminal 2' may be otherwise polarized with the lesser potential during the operating step and with the greater potential during the regeneration step, without departing from the protective scope of the present patent.

Preferably, in accordance with the embodiment illustrated in FIG. 4, each switch 22', 22", 23', 23" is obtained with a semiconductor electronic device, such as in particular a MOSFET having its gate terminal controlled by the control circuit 24 for driving the switching of the switch 22', 22", 23', 23" itself.

In addition, still with reference to the embodiment illustrated in FIG. 4, the control module PWM of the control circuit 24 is connected to a first control switch 22' of the aforesaid first pair of switches and to a second control switch 23' of the aforesaid second pair of switches, and it is adapted to drive the switching of the first and the second control switch 22', 23' in order to respectively modulate the first and the second pulsed voltage respectively with a first and with a second duty cycle. Each of such duty cycles is selected proportional to the ratio between the average value of the corresponding pulsed voltage to be applied to the capacitor 4 and the (direct) supply voltage $V_A$ supplied by the electrical power supply means 13 to the H-bridge of the modulation circuit 14.

More in detail, in accordance with the particular embodiments illustrated in the enclosed figures, in which the cell 2 comprises multiple capacitors 4 in series, each aforesaid duty cycle is selected equal to the ratio between the average value of the corresponding pulsed voltage and the supply voltage $V_A$, multiplied by the number of capacitors 4 in series of the cell 2.

Otherwise, in the case in which the cell comprises only one capacitor, or multiple capacitors in parallel, the duty cycle coincides with the ratio between the average value of the corresponding pulsed voltage and the supply voltage $V_A$.

Advantageously, the control circuit 24, during the operation of the apparatus 1, is adapted to adjust, with an adaptive control, the value of the duty cycle of the pulsed voltages as a function of specific operating parameters, such as the flow rate of the fluid that flows into the cell 2, or the degree of salinity of the fluid itself.

Functionally, the operating cycle of each cell 2 provides for a step of charging with direct polarity, in which the control circuit 24 applies the first pulsed voltage between the facing electrodes of each capacitor 4, and the operating step in which, with the electrodes charged, the flow of the liquid to be treated is forced to pass between the electrodes themselves by means of the supply pipe 6.

More in detail, during the step of charging with direct polarity, in which the operating step of the cell 2 occurs, the control circuit 24 controls the modulation circuit 14 to connect the first connection terminal 2' of the cell 2 to the positive output terminal 51' of the AC/DC converter 15, and the second connection terminal 2" of the cell 2 to the negative output terminal 51" of the AC/DC converter 15, driving the first pair of switches 22', 22" into closed position and the second pair of switches 23', 23" into open position.

Still more in detail, the control module PWM of the control circuit 24 drives the first control switch 22' to cyclically switch (at a predetermined frequency specified in detail hereinbelow), maintaining it open for a first time interval $T_{on}$ of the switching period and maintaining it closed for a second time interval $T_{off}$ of the switching period. In this manner, a square wave pulsed voltage is applied to the connection terminals 2', 2" of the cell 2 with peak voltage equal to the supply voltage $V_A$. The length of the first time interval $T_{on}$ (in which the first control switch 22' is closed) determines the first duty cycle (equal to $T_{on}/(T_{on}+T_{off})$) of the first pulsed voltage, and therefore the average value of the latter (which is proportional to the product of the first duty cycle and the supply voltage $V_A$, in accordance with that specified above).

Preferably, during the step of charging with direct polarity and the operating step of the cell 2, the other switch 22" of the first pair of switches of the H-bridge is driven by the control circuit 24 to remain constantly in closed position.

The average value of the first pulsed voltage applied between the electrodes of the capacitor 4 generates (as described in detail hereinbelow) a first electric field adapted to attract, on the electrodes themselves, the ionized particles present in the flow of the liquid that passes through the capacitor 4. Therefore, during the operating step of the cell 2, the purification of the liquid of the ionized particles occurs due to the fact that the ionized particles are attracted by the respective electrodes with polarity opposite thereto, determining a progressive accumulation of the ionized particles on the electrodes.

Once the programmed saturation of the electrodes has been reached with the ionized particles present in the liquid to be treated, the regeneration step of the cell 2 is provided in which the flow of washing liquid is forced to pass between the facing electrodes of each capacitor 4 of the cell 2 in order to remove the ionized particles accumulated on the electrodes of the capacitors 4.

More in detail, during the regeneration step, a first step of discharging the cell 2 is provided with short-circuiting of the electrodes of each capacitor 4, in which the control circuit 24 drives the permanent closure of the two control switches 22', 23' and the permanent opening of the other two switches 22", 23" of the H-bridge.

Subsequently, a step of charging with reversed polarity is provided, in which the facing electrodes of each capacitor 4 are subjected to the second pulsed voltage (having average value with reversed polarity with respect to the first pulsed voltage applied during the step of charging with direct polarity), and aimed to move the charged particles away from the electrodes on which they had accumulated so that they are taken away by the washing liquid.

Then, a new step is provided for discharging with short-circuiting of the electrodes of each capacitor 4, before restarting a subsequent step of charging with direct polarity.

In particular, during the aforesaid step of charging with reversed polarity the control circuit 24 controls the modulation circuit 14 to connect the first connection terminal 2' of the cell 2 to the negative output terminal 51" of the AC/DC converter 15, and the second connection terminal 2" of the cell 2 to the positive output terminal 51' of the AC/DC converter 15, driving the first pair of switches 22', 22" into open position and the second pair of switches 23', 23" into closed position.

Still more in detail, analogous to that described above for the step of charging with direct polarity, the control module PWM of the control circuit 24 drives the second control switch 23' to cyclically switch, maintaining it open for a first time interval $T_{on}$ of the switching period and maintaining it closed for a second time interval $T_{off}$ of the switching period. In this manner, the second pulsed voltage having square waveform is applied to the connection terminals 2', 2" of the cell 2 with peak voltage equal to the opposite of the supply voltage $V_A$. The length of the first time interval $T_{on}$ (in which the second control switch 23' is closed) determines the second duty cycle of the second pulsed voltage, and therefore the average value of the latter.

Preferably, during the step of charging with reversed polarity of the cell 2, the other switch 23" of the second pair of switches of the H-bridge is driven by the control circuit 24 to remain constantly in closed position.

The average value of the second pulsed voltage applied between the electrodes of each capacitor 4 of the cell 2 generates a second electric field (with direction opposite the first electric field generated during the step of charging with direct polarity) adapted to push the ionized particles accumulated on the electrodes to move away from the latter so that such ionized particles can be removed by the washing liquid.

In this manner, during the steps of charging the cells 2 with direct polarity and with reversed polarity, the control module PWM determines the duty cycle of the pulsed voltages applied to the electrodes of each capacitor 4, in order to obtain an average value equal to the equivalent direct operating voltage that it is desired to apply to the capacitors 4 of the cell 2. Such average value is advantageously substantially comprised between about 0.3 V and 2 V, and preferably between about 1.2 V and 1.7 V, and is equal in particular to about 1.5 V.

Advantageously, the pulsed voltage applied between the facing electrodes of each capacitor 4 has a frequency greater than about 30 Hz, and in particular lower than 100 kHz. Preferably, in accordance with a particular embodiment, the frequency of the pulsed voltage is greater than about 100 Hz and in particular is equal to about 150 Hz.

Advantageously, as stated above, the frequency of the pulsed voltage determines a speed of the voltage variation between the facing electrodes of the capacitor 4 that is greater than the migration speed of the ionized particles in the liquid that passes between the electrodes themselves. Therefore, the ionized particles are not affected by the variable electric field generated by the pulsed voltage applied between the electrodes, but are subject to the action of an equivalent constant electric field that would be generated by a direct operating voltage equal to the average value of such pulsed voltage. Therefore, the application between the electrodes of the capacitor 4 of the aforesaid pulsed voltages determines an important reduction of the capacitance of the liquid that passes through the electrodes themselves, due to the electrical dispersion in aqueous solutions, known to the man skilled in the art, due to which the dielectric permittivity of the liquid, which passes between the electrodes, decreases with the increase of the frequency of the electric field applied thereto.

In accordance with a particular embodiment, by applying a pulsed voltage with frequency of about 100 Hz, one obtains a specific capacitance of each capacitor 4 less than 2-4 F per gram of active carbon of the electrodes and in particular preferably on the order comprised between 0.01-1 F per gram of active carbon.

In this manner, the electrical power supply means 13 must supply a very small quantity of electrical energy per pulse cycle in order to charge each capacitor 4, with a consequent low power consumption which leads to a high energy efficiency of the apparatus 1.

In addition, this leads to low power dissipation on the electrical and electronic components of the modulation circuit 14, and in particular on the MOSFETs of the switches 22', 22", 23', 23", determining a substantially negligible heat generation that does not require the use of particular devices for the dissipation of the heat, with a consequent structural simplification of the apparatus 1 and thus with a low production cost thereof.

In addition, the configuration of the modulation circuit 14 according to the present invention, which provides to drive the switches 22', 22", 23', 23" of the H-bridge by means of the control module PWM with pulse width modulation, allows adjusting the value of the operating voltage applied to the capacitors 4 without the use of a further DC/DC converter for reducing the direct supply voltage supplied by the AC/DC converter 15 of the electrical power supply means 13, with consequent structural simplification of the apparatus 1. In particular, such configuration allows adjusting the operating voltage of the capacitor 4 starting from any operating value (comprised for example between 3 V and 12 V) of the supply voltage $V_A$ applied to the H-bridge, and therefore allows obtaining the electrical power supply means 13 by using standardized products widespread on the market, which generally have a low purchase cost and a high energy efficiency, and thus without having to arrange power supply devices specifically designed for supplying specific supply voltages.

Figure 7:
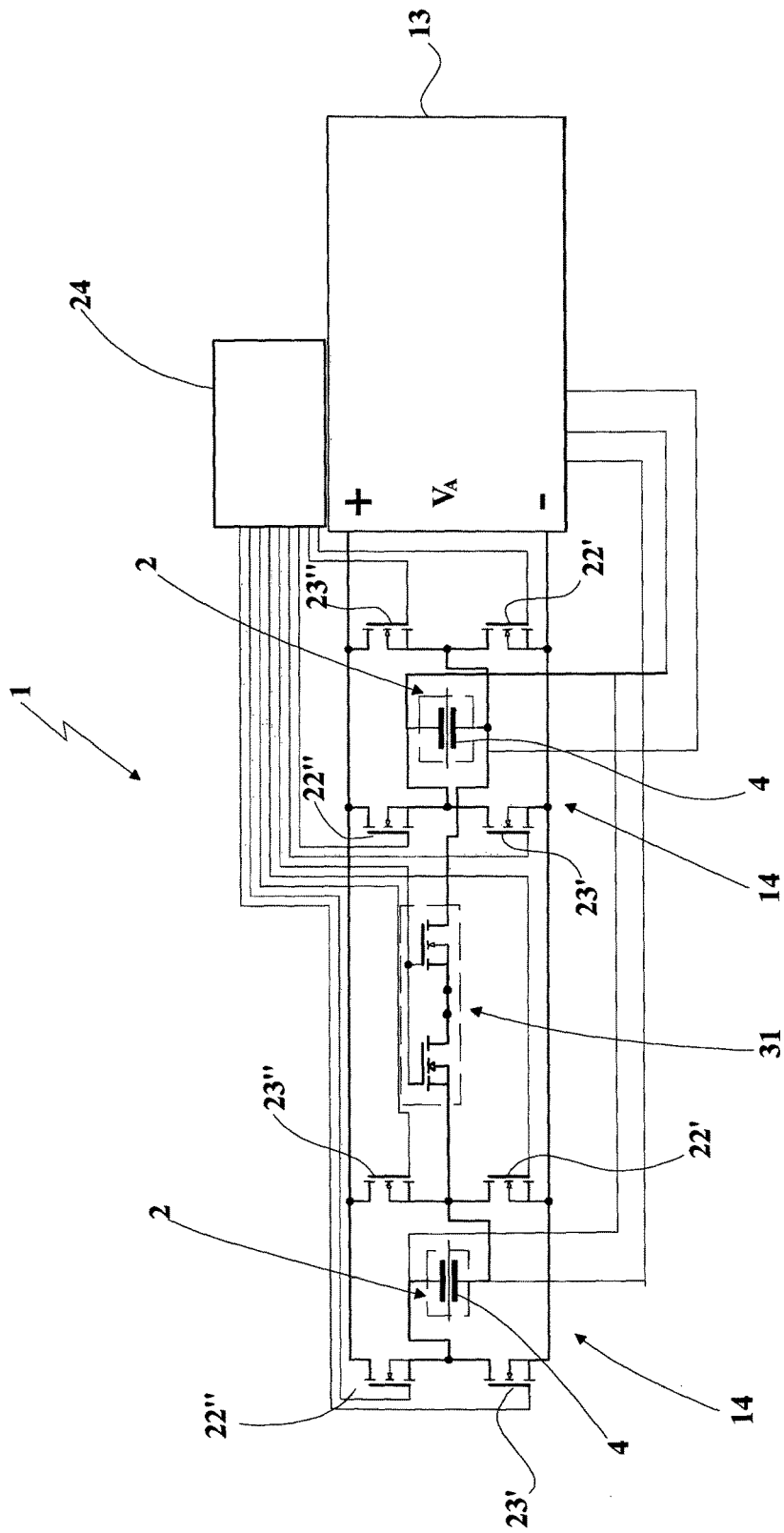
FIG. 7 shows an example of a circuit diagram of the present apparatus according to a different particular embodiment of the present invention.

In accordance with a different particular embodiment of the present invention illustrated in FIG. 7, the apparatus 1 comprises an even number of cells 2 (e.g. two) each of which supplied by a corresponding modulation circuit 14 connected to the electrical power supply means 13. In particular, the control circuit 24 of the apparatus 1 is adapted to drive, by means of the control module PWM, each modulation circuit 14 in order to apply to the capacitors 4 of the corresponding cell 2 the pulsed voltages with average value equal to the desired operating voltages to be applied between the facing electrodes of each capacitor 4, in accordance with the characteristics of the present invention as described above.

In addition, the control circuit 24 is adapted to drive the switches 22', 22", 23', 23" of each modulation circuit 14 in order to control the operation of the corresponding cells 2 according to operating cycles staggered from each other, in a manner such that when one cell 2 is in operating step charged with direct polarity, the other cell 2 is in regeneration step with the electrodes deactivated, or short-circuited, or charged with reversed polarity.

More in detail, the control circuit 24 drives the operation of the modulation circuits 14 of the cells 2 in a manner such that when a cell 2 is at the start of its charging step, the other cell 2, having terminated its operating step, starts its regeneration step by connecting itself in series with reversed polarity to the cell 2 that is in operating step, in order to at least partly discharge its electrodes on the latter cell 2. Advantageously, the connection in series of the two cells 2 is obtained by driving a connection switch 31 placed between the two H bridges of the two modulation circuits 14 of the cells 2.

In this manner, the apparatus 1 in accordance with the latter embodiment allows transferring the charge energy accumulated on the electrodes of the capacitors 4 of a cell 2 during the operating step (and due to the charged particles retained on the electrodes themselves) on the discharged capacitors 4 of the other cell 2 which require being charged, with a consequent recovery of the energy accumulated in the cells 2 during their operating step.

Figure 5:
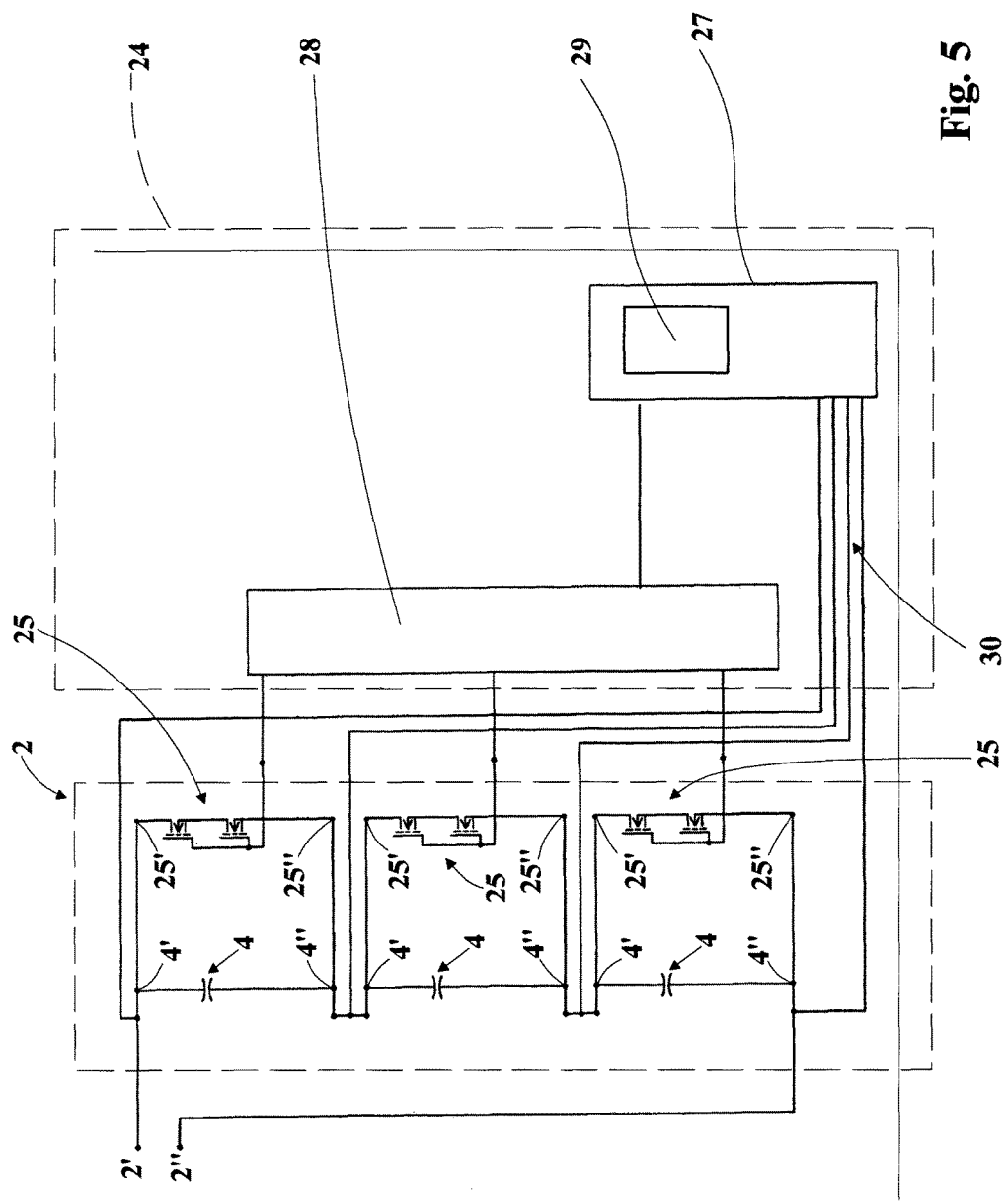
FIG. 5 shows a circuit diagram of a detail of the apparatus represented in FIG. 4 relative to a cell of the apparatus itself, according to a first embodiment of the cell itself.
Figure 6:
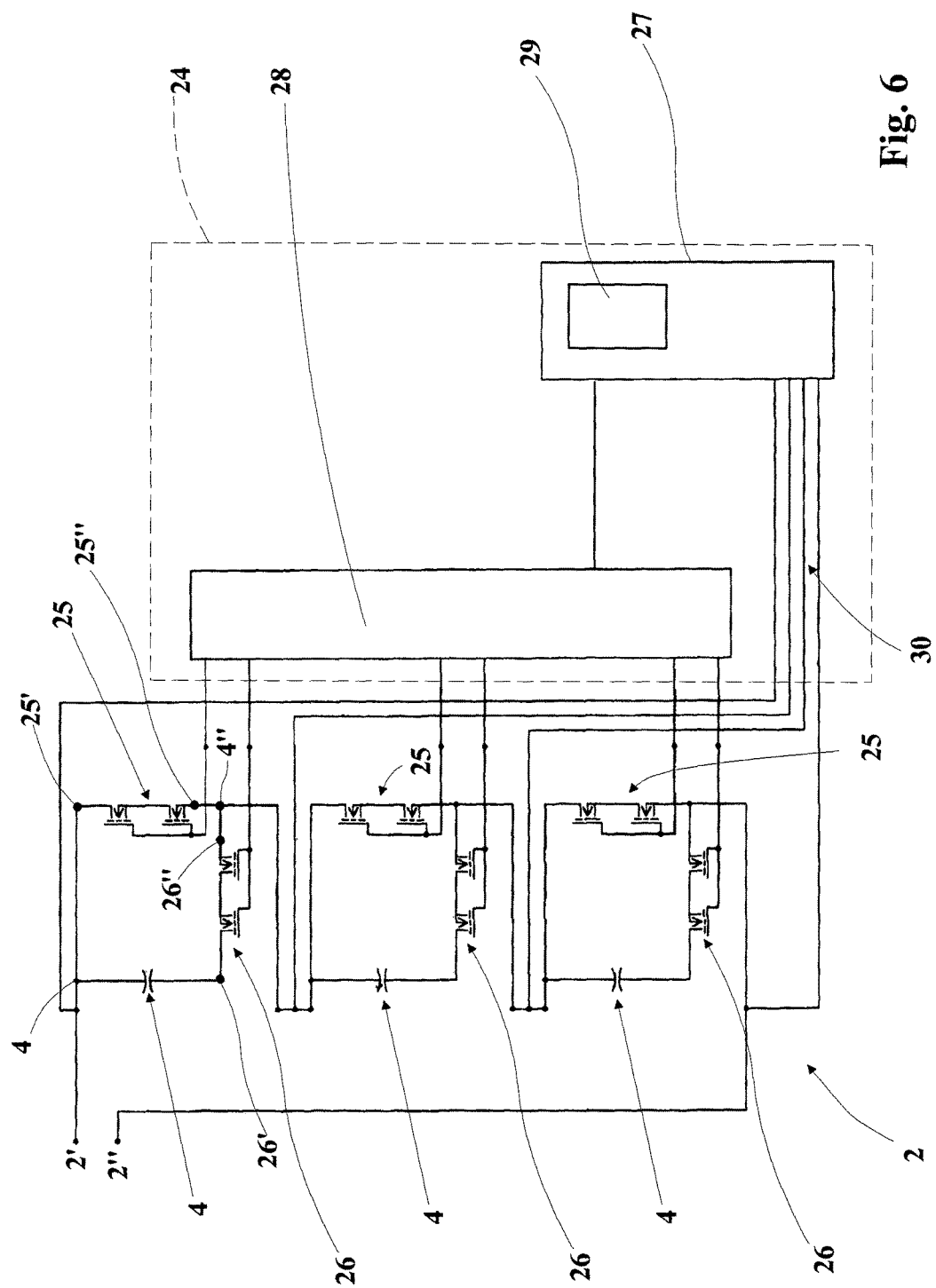
FIG. 6 shows a circuit diagram of a further detail of the apparatus represented in FIG. 2 relative to a cell of the apparatus itself, in accordance with a second embodiment of the cell itself.

Advantageously, in particular with reference to the embodiments of FIGS. 5 and 6, the cell 2 of the present apparatus 1 comprises two or more flow-through capacitors 4 (e.g. three in the particular embodiments illustrated in the enclosed figures), which are electrically connected in series by means of their power supply nodes 4', 4" between the two connection terminals 2', 2" of the cell 2 itself.

More in detail, still with reference to the embodiments illustrated in FIGS. 5 and 6, each capacitor 4 of the cell 2 is provided with two opposite power supply nodes 4', 4" through which it is connected to the adjacent capacitors 4. The first and the last capacitor of the series of capacitors 4 have one of their power supply nodes connected respectively to the first and to the second connection terminal 2', 2" of the cell 2.

Advantageously, the apparatus 1 comprises an electrical power supply module 11 connected by means of two output terminals 11', 11" thereof to the connection terminals 2', 2" of the cell 2 in order to apply, between the power supply nodes 4', 4" of each capacitor 4, at least one operating voltage adapted to charge the pairs of facing electrodes of each capacitor 4 itself with charges with opposite sign.

The electrical power supply module 11 can supply the cell 2 of the apparatus 1 with any substantially direct voltage, by "substantially direct" it being intended a pulsed voltage having direct average value (as in the above-described embodiment), or a constant direct voltage and hence in particular even in the absence of the modulation circuit 14 driven by the control module PWM.

Nevertheless, preferably, the electrical power supply module 11 comprises the aforesaid power supply means 13 and the modulation circuit 14 adapted to power supply the capacitors 4 of the cell 2, in accordance with the first embodiment described above.

Otherwise, the electrical power supply module 11 of the present apparatus 1 power supplies the capacitors 4 of the cell 2 with a constant direct voltage, by means of for example a DC/DC converter interposed between the electrical power supply means 13 and the cell 2 and adapted to convert the direct supply voltage $V_A$ supplied by the electrical power supply means 13 into a constant operating voltage that is applied to the connection terminals 2', 2" of the cell 2. The cycle of each cell 2, as stated above, provides in a per se entirely conventional manner that is well known to the man skilled in the art, a step of charging with direct polarity, in which the facing electrodes of the capacitors 4 of the cell 2 are charged to different polarities and brought to the provided operating voltage, and an operating step in which, with the electrodes charged, the flow of liquid to be treated is forced to pass through the capacitors 4 of the cell 2 by means of the supply pipe 6 and the extraction pipe 8. During such operating step, there is the cleaning of the liquid of the ionized particles due to the fact that the latter are attracted by the respective electrodes of the capacitor 4 with polarity opposite thereto, determining a progressive accumulation of the ionized particles on the same electrodes.

Once the programmed saturation of the electrodes has been reached with the ionized particles present in the liquid to be treated, a regeneration step of the cell 2 is provided, in which the flow of washing liquid is forced to pass between the facing electrodes of each capacitor 4 of the cell 2 in order to remove the ionized particles accumulated on the electrodes of the capacitors 4.

More in detail, during the regeneration step, a first step of discharging the cell 2 is provided with short-circuiting of the electrodes of each capacitor 4, and a step of charging with reversed polarity, in which the facing electrodes of each capacitor 4 are subjected to an operating voltage having reversed polarity with respect to the step of charging with direct polarity, aimed to move the ionized particles away from the electrodes on which they accumulated so that they are taken away by the washing liquid. Then, a new step for discharging is preferably provided, with short-circuiting of the electrodes of each capacitor 4, before restarting a subsequent step of charging with direct polarity.

In the embodiment described in the present discussion, it is conventionally deemed that, during the operating step, the first connection terminal 2' of the cell 2 is subjected to a greater potential than the potential of the second connection terminal 2", whereas in the regeneration step the first connection terminal 2' is subjected to a lesser potential with respect to the second connection terminal 2". Of course, the first connection terminal 2' may be otherwise polarized with a lesser potential during the operating step and with a greater potential during the regeneration step, without departing from the protective scope of the present patent.

Advantageously, the control circuit 24 is provided with detection means 27 connected to the power supply nodes 4', 4" of each capacitor 4 of the cell 2 for detecting values of the operating voltage applied by the electrical power supply module 11 to each capacitor 4.

In addition, the cell 2 comprises a first adjustment switch 25 connected in parallel to the power supply nodes 4', 4" of each capacitor 4. More in detail, with reference to the embodiments illustrated in FIGS. 5 and 6, each first adjustment switch 25 is provided with two first terminals 25', 25" electrically connected to the respective power supply nodes 4', 4" of the corresponding capacitor 4.

In addition, the aforesaid control circuit 24 of the apparatus 1 is provided with a command module 28 adapted to drive each first adjustment switch 25 to switch between a first closed position, in which the first adjustment switch 25 allows the passage of current between its first terminals 25', 25" in order to bypass the current that passes through the corresponding capacitor 4, and a first open position, in which the first adjustment switch 25 prevents the passage of current between its first terminals 25', 25", allowing the passage of the current through the corresponding capacitor 4.

Each first adjustment switch 25 of the cell 2 is actuated by the command module 28 of the control circuit 24 to switch into the first closed position when the detection means 27 measures a value of the operating voltage (applied to the corresponding capacitor 4) greater in absolute value than a predetermined threshold value.

In this manner, the switching of the first adjustment switch 25 into the first closed position controlled by the command module 28 allows, as explained in detail hereinbelow, bringing the operating voltage applied to the power supply nodes 4', 4" of the capacitor 4 to the aforesaid threshold value. The latter is preferably arranged equal to a nominal value of the operating voltage to be applied to each capacitor 4 in order to optimize the efficiency of the cell 2 in terms of purification of the liquid. Such nominal value is for example determined as a function of the structural characteristics of the electrodes of the capacitor 4 itself, or of the physical and chemical characteristics of the liquid to be treated. Such nominal value is advantageously substantially comprised between about 0.3 V and 2 V, and preferably between about 1.2 V and 1.7 V, and in particular is equal to about 1.5 V.

In accordance with an embodiment of the present invention (not illustrated) in which the apparatus 1 comprises multiple cells 2 for the purification of the liquid to be treated, it will be possible to control in a dedicated manner the operating voltage of the capacitors 4 of each cell 2, and in particular it will be possible to supply each cell 2 with a specific corresponding voltage, for example as a function of the type or of the size of the capacitors 4 of the cell 2, of the mode of use of each cell 2 in accordance with the specific configurations of the hydraulic plant, or of the duration of use provide for each cell 2, etc.

Advantageously, the detection means 27 of the control circuit 24 of the apparatus 1 comprise a processing unit 29, preferably provided with microprocessor, which is connected to the power supply nodes 4', 4" of each capacitor 4 of the cell 2 by means of corresponding electrical connections 30 in order to detect the values of the operating voltage applied to each capacitor 4, and is adapted to compare such values with the aforesaid threshold value in order to consequently enable the switching of the first adjustment switch 25.

Advantageously, when the operating voltage applied to each capacitor 4 exceeds, in absolute value, the threshold value, the corresponding first adjustment switch 25 is driven to cyclically open or close with a specific frequency, as described more in detail hereinbelow.

In particular, the switching of each first adjustment switch 25 (controlled by the command module 28 of the control circuit 24 when the operating voltage exceeds, in absolute value, the threshold value) is pulsed.

Advantageously, the command module 28 of the control circuit 24 comprises a pulsed signal generator which, at values of the operating voltage greater in absolute value than the threshold value, is enabled to send to the first adjustment switch 25 a sequence of control pulses that drive the first adjustment switch 25 itself to cyclically switch between the first closed position and the first open position.

More in detail, preferably, the command module 28 of the control circuit 24 drives the first adjustment switch 25 to cyclically switch, into the first closed position of the pulsed switching for a first status interval T1 (corresponding to the duration of the high signal of the sequence of pulses) and to switch into the first open position for a second status interval T2 (corresponding to the duration of the low signal for a sequence of pulses), with a frequency for example on the order of tens of Hz and preferably ranging from 30 to 300 Hz.

Functionally, when the value of the operating voltage between the power supply nodes 4', of the capacitor 4 exceeds, in absolute value, the aforesaid threshold value, the control circuit 24, by means of the aforesaid command module 28, drives the corresponding first adjustment switch 25 to cyclically switch between the first closed and open position until the value of the operating voltage at the power supply nodes 4', 4" of the capacitor 4 falls below the aforesaid predetermined threshold value.

In particular, the first adjustment switch 25 in the first closed position acts as a bypass for the current supplied by the electrical power supply module 11 to the corresponding capacitor 4.

More in detail, since the equivalent impedance of the first adjustment switch 25 in the first closed position is much lower than the impedance of the corresponding capacitor 4, the current passes through the first adjustment switch 25 itself without substantially supplying the capacitor 4 in the first status intervals T1 in which the first adjustment switch 25 is driven into the first closed position by the high signals of the sequence of control pulses sent by the pulsed signal generator of the command module 28.

In accordance with the embodiment illustrated in FIG. 5, the closure of the first adjustment switch 25 in the aforesaid first status intervals T1 determines the short-circuiting of the corresponding capacitor 4, which is consequently discharged, reducing the operating voltage applied between its power supply nodes 4', 4".

When the value of the operating voltage measured by the detection means 27 of the control circuit 24 falls, in absolute value, below the threshold value, the command module 28 disables the operation of the pulsed signal generator in order to interrupt the sending of the sequence of control pulses to the first adjustment switch 25, which consequently remains constantly positioned in the first open position. In this manner, the current supplied by the electrical power supply module 11 returns to traversing the capacitor 4 according to the normal power supply conditions.

In particular, the microprocessor of the detection means 27 of the control circuit 24 is programmed for enabling the opening and the closing of the first adjustment switches 25 of the cell 2 in a manner such that the latter are never all simultaneously in their first closed position, in order to prevent the short-circuiting of the output terminals 11', 11" of the electrical power supply module 11.

Advantageously, in accordance with the embodiment illustrated in FIG. 6, the cell 2 of the apparatus 1 comprises a second adjustment switch 26 connected in series with the corresponding capacitor 4 and in particular arranged between one end of the capacitor 4 and the power supply node 4" that supplies such end.

More in detail, each second adjustment switch 26 is provided with two second terminals 26', 26" with one connected to the end of the corresponding capacitor 4 and the other to the first adjustment switch 25 connected in parallel to the power supply nodes 4', 4" of the same capacitor 4.

Each second adjustment switch 26 is actuatable by the control circuit 24 to switch between a second closed position, in which the second adjustment switch 26 allows the passage of current between its second terminals 26', 26", thus allowing the passage of the current through the corresponding capacitor 4, and a second open position, in which the second adjustment switch 26 prevents the passage of current between its second terminals 26', 26" in order to interrupt the current supply to the corresponding capacitor 4.

More in detail, the second adjustment switch 26 is actuated by the command module 28 of the control circuit 24 to switch into the second open position at at least one value of the operating voltage (applied to the corresponding capacitor 4) greater in absolute value than the aforesaid predetermined threshold value.

Therefore, the second adjustment switch 26 is driven by the control circuit 24 to open when the first adjustment switch 25 of the corresponding capacitor 4 is driven to close, in order to prevent the short-circuiting of the capacitor 4 itself.

In this condition, the voltage between the power supply nodes 4', 4" of the capacitor 4 is reduced due to the accumulation, on the electrodes of the capacitor 4 itself, of the ionized particles with charge opposite that of the electrodes, such particles contained in the liquid that passes through the capacitor 4.

In this manner, it is possible to bring the value of the operating voltage below the threshold value without any dissipation of current and hence with an ensuing energy savings. The embodiment of the cell 2 provided with the second adjustment switch 26 is particularly advantageous with very large capacitors 4 (provided with many superimposed electrodes), which are susceptible to accumulate at their interior a high quantity of charge, which would cause a high energy dissipation if the capacitor 4 was short-circuited.

Functionally, when the operating voltage at the power supply nodes 4', 4" of the capacitor 4 returns below the threshold value, the control circuit 24 drives the second adjustment switch 26 to switch into the second closed position, and simultaneously, drives the first adjustment switch 25 to switch into the first open position, in order to allow the passage of current through the corresponding capacitor 4.

Advantageously, in particular, the control circuit 24 is adapted to drive the closing and the opening of the two adjustment switches 25, 26 associated with each capacitor 4 in a manner such that such two adjustment switches 25, 26 are never both simultaneously open, in order to prevent the interruption of the passage of electric current through the series of the capacitors 4.

Advantageously, the electrical power supply module 11 is adapted to apply, between the power supply nodes 4', 4" of each capacitor 4 of the cell 2, a pulsed voltage having average value proportional to the aforesaid operating voltage, preferably in accordance with the embodiment of FIG. 2 described in detail above.

Advantageously, the processing unit 29 of the detection means 27 of the control circuit 24 is adapted to calculate the average value of the pulsed voltage applied to the power supply nodes 4', 4" of each capacitor 4 and to compare such average value with the aforesaid threshold value in order to enable the switching of the adjustment switches 25, 26 in accordance with that described above.

Preferably, the processing unit 29 of the detection means 27 is connected to the power supply nodes 4', 4" of each capacitor 4, by means of a RC circuit (not illustrated) in order to detect the average value of the pulsed voltage applied to the capacitor 4.

Advantageously, the modulation circuit 14 of the electrical power supply module 11 is adapted to alternately apply operating voltages with opposite polarities between the power supply nodes 4', 4" of each capacitor 4 of the cell 2, in order to charge the cell 2 with direct polarity or with reversed polarity respectively during the operating step and during the regeneration step.

Each first adjustment switch 25 of the cell 2, and preferably also the second adjustment switch 26, are of bidirectional type, with the term "bidirectional" it being intended that the first and the second adjustment switch 25, 26 allow the passage of the current in both directions when they are in the corresponding closed position, and block the passage of current in both directions when they are in the corresponding open position.

In this manner, in particular, the adjustment switches 25, 26 in their open position allow interrupting the passage of the electric current independent of the polarity of the voltage) applied between the power supply nodes 4', 4" of the corresponding capacitor 4. Therefore, the use of such bidirectional adjustment switches 25, 26 advantageously allows adjusting the value of the operating voltage both during the step of charging the cell 2 with direct polarity and during the step of charging the cell 2 with reversed polarity.

Advantageously, with reference to the embodiments illustrated in FIGS. 5 and 6, each adjustment switch 25, 26 comprises a semiconductor electronic device, preferably provided with two MOSFETs connected in series and having the gate terminals connected to each other. The two gates of the two MOSFETs of each switch 14, 18 are controlled by the command module 28 of the control circuit 24 for driving the switching of the corresponding adjustment switch 25, 26.

Also forming an object of the present invention is a process for the purification of a liquid, obtained in particular by means of the apparatus 1 of the above-described type.

Hereinbelow, for the sake of simplicity, reference will be made to the same nomenclature introduced up to now, even if it must be intended that the present process can also be obtained with apparatuses not provided with all of the above-considered characteristics.

The present process for the purification of a liquid comprises a step for the electrical power supply of the cell 2 with at least one operating voltage, obtained in particular by means of the actuation of the electrical power supply means 13, of the modulation circuit 14 and of the control circuit 24 described in detail above.

Advantageously, the step for the electrical power supply of the cell 2 comprises the aforesaid steps of charging with direct polarity, of discharging and of charging with reversed polarity described in detail above.

In addition, the present process comprises a step for the flow of a liquid to be treated between the electrodes of the capacitor 4, obtained in particular by means of the actuation of the source of the liquid to be treated and of the shut-off valves 6', 9' and 10' of the hydraulic plant described above.

Advantageously, the step of flow of the liquid to be treated between the electrodes of the capacitor 4 comprises the aforesaid steps of operating and regeneration, described in detail above.

In accordance with the idea underlying the present invention, in the power supply step of the present process, the electrical power supply means 13 supply at least one direct supply voltage $V_A$ to the modulation circuit 14 which, as described in detail above with reference to the apparatus 1, is connected to the capacitor 4 of the corresponding cell by means of at least one switch 22', 22", 23', 23".

In addition, in the power supply step, the control module with pulse width modulation PWM of the control circuit 24 drives the switching of the switch 22', 22", 23', 23", which applies to the facing electrodes of the capacitor 4 a pulsed voltage having average value proportional to the aforesaid operating voltage.

The power supply of the capacitor 4 of the cell 2 by means of pulsed voltage according to the present invention allows obtaining the effect of reducing the capacitance of the capacitor 4 (as discussed in detail above), in particular obtaining the aforesaid advantages of high efficiency of cleaning of the liquid to be treated and high energy efficiency.

Advantageously, in the power supply step, the pulsed voltage supplied by the modulation circuit 14 is such to determine a variable electric field within the capacitor 4 having variation speed greater than the mobility of the ionized particles in said liquid, as discussed above in detail.

Preferably, in the power supply step, the control circuit 24 actuates the two pairs of switches 22', 22" and 23', 23" of the H-bridge of the modulation circuit 14 to alternately apply operating voltages with opposite polarities between the facing electrodes of the capacitor 4.

In particular, the first pair of switches 22', 22" of the H-bridge applies, to the facing electrodes of the capacitor 4, a first pulsed voltage adapted to attract the ionized particles of the liquid on the electrodes themselves; alternatively, the second pair of switches 23', 23" of the H-bridge applies to the facing electrodes of the capacitor 4 a second pulsed voltage having average value with polarity opposite the average value of the aforesaid first pulsed voltage and adapted to move the ionized particles away from the electrodes themselves.

In addition, the control module PWM drives the switching of the first control switch 22' (of the aforesaid first pair of switches 22', 22") and the second control switch 23" (of the aforesaid second pair of switches 23', 23") in order to respectively modulate the first and the second pulsed voltage respectively with a first and with a second duty cycle proportional to the ratio between the average value of the corresponding pulsed voltage to be applied to the capacitor 4 and the direct supply voltage $V_A$.

Advantageously, the pulsed voltage has a frequency greater than about 30 Hz, and preferably greater than about 100 Hz and preferably has square waveform.

Advantageously, according to a particular embodiment of present invention, the power supply step of the cell 2 is obtained by means of the actuation of the aforesaid electrical power supply module 11.

As stated above, in such power supply step, the electrical power supply module 11 can supply the cell 2 with any one substantially direct voltage, by "substantially direct" it being intended a pulsed voltage having direct average value (as in the embodiment described above), or a constant direct voltage and hence in particular even in the absence of the modulation circuit 14 driven by the control module PWM.

Advantageously, during the power supply step of the cell 2, the present process provides for a step for measuring at least one value of the operating voltage applied to the power supply nodes 4', 4" of each capacitor 4, such measuring step obtained by means of the aforesaid said detection means 27 of the apparatus 1.

In addition, a step is provided for comparing the aforesaid voltage value with respect to a predetermined threshold value, in particular obtained by means of the processing unit 29 of the detection means 27.

In addition, when the voltage value measured by the detection means 27 is greater in absolute value than a predetermined threshold value, a step is provided for adjusting the voltage to the power supply nodes 4', 4" of each capacitor 4, in which the command module 28 of the control circuit 24 actuates the corresponding first adjustment switch 25 to switch at least into the first closed position, in order to adjust the voltage at the power supply nodes 4', 4" of the capacitor 4 itself.

Such adjustment step, advantageously, is executed during the flow step of the liquid to be treated into the capacitors 4, in a manner such to allow adjusting the voltage at the power supply nodes 4', 4" of each capacitor 4 without interrupting the purification process and in particular without interrupting the operation of the cell 2.

Advantageously, in the adjustment step, the command module 28 drives the first adjustment switch 25 to cyclically switch between its first closed position and its first open position until the value of the operating voltage substantially returns to the threshold value.

Preferably, the switching of the first adjustment switch 25 controlled by the command module 28 is pulsed, in order to adjust the voltage at the power supply nodes 4', 4" of the corresponding capacitor 4, as discussed in detail above.

Advantageously, in the adjustment step, when the value of the operating voltage at the power supply nodes 4', 4" of the capacitor 4 is greater in absolute value than the aforesaid threshold value, the command module 28 actuates the second adjustment switch 26 to switch into said second open position, in order to prevent the short-circuiting of the corresponding capacitor 4 for the purpose of preventing current dissipation (with an ensuing energy savings as detailed above).

Advantageously, in the measuring step the processing unit (29) calculates the average value of the pulsed voltage applied by the modulation circuit 14 to the capacitors 4, and in the comparison step the processing unit (29) compares the average value of the pulsed voltage with the threshold value, in order to enable the execution of the adjustment step if such average value exceeds, in absolute value, the threshold value.

The apparatus thus conceived therefore attains the preset objects.

The invention claimed is:

1. Apparatus with flow-through capacitors for the purification of a liquid, such apparatus comprising:
   - at least one cell which is provided with at least one flow-through capacitor provided with two or more electrodes facing each other, between which a liquid to be treated containing ionized particles is susceptible to flow;
   - an electrical power supply adapted to supply a direct current supply voltage ($V_A$);
   - a modulation circuit electrically connected in input to said electrical power supply in order to receive said direct current supply voltage ($V_A$), electrically connected in output to said at least one flow-through capacitor and provided with at least one switch actuatable to apply at least one operating voltage between the facing electrodes of said at least one flow-through capacitor;
   - a control circuit connected to said at least one switch and provided with a control module with pulse width modulation (PWM), wherein said control circuit drives the switching of said at least one switch so that said at least one switch supplies power to said facing electrodes with at least one pulsed voltage having average value proportional to said operating voltage;
   - wherein said pulsed voltage has rectangular waveform having a duty cycle adjustable by said control circuit, so that said pulsed voltage having rectangular waveform is applied to said at least one flow-through capacitor;
   - wherein said pulsed voltage has a frequency greater than about 30 Hz.

2. Apparatus with flow-through capacitors for the purification of a liquid according to claim 1, wherein said modulation circuit comprises an H-bridge electrically connected in input to said electrical power supply and electrically connected in output to said at least one flow-through capacitor, and said at least one switch comprises at least two pairs of switches of said H-bridge actuatable by said control circuit in order to alternately apply operating voltages with opposite polarities between the facing electrodes of said at least one flow-through capacitor.

3. Apparatus with flow-through capacitors for the purification of a liquid according to claim 2, wherein said H-bridge comprises a first pair of switches actuatable for applying, between the facing electrodes of said at least one flow-through capacitor, a first pulsed voltage susceptible to attract the ionized particles of said liquid on said electrodes, and a second pair of switches actuatable for applying, between said facing electrodes, a second pulsed voltage having average value with polarity opposite the polarity of the average value of said first pulsed voltage and susceptible to move the ionized particles away from said electrodes;
   said control module with pulse width modulation (PWM) being connected to at least one first switch of said first pair of switches and to at least one second switch of said second pair of switches, and being adapted to drive the switching of said first and said second switch in order to respectively modulate said first and said second pulsed voltage respectively with a first and with a second duty cycle proportional to the ratio between the average value of the corresponding said pulsed voltage to be applied to said at least one flow-through capacitor and said direct current supply voltage ($V_A$).

4. Apparatus with flow-through capacitors for the purification of a liquid according to claim 1, wherein said at least one switch of said modulation circuit comprises at least one semiconductor electronic device.

5. Apparatus with flow-through capacitors for the purification of a liquid according to claim 1, wherein said cell is provided with two connection terminals and comprises at least two said flow-through capacitors, which are susceptible to be traversed by said liquid to be treated containing ionized particles and are electrically connected in series, by means of their power supply nodes, between the connection terminals of said cell;
wherein said cell comprises at least one first adjustment switch connected in parallel to the power supply nodes of each said flow-through capacitor;
wherein said control circuit is provided with:
detection means connected to the power supply nodes of each flow-through capacitor of said cell for detecting values of the operating voltage between the power supply nodes of each said flow-through capacitor,
a command module adapted to actuate said first adjustment switch to switch between a first closed position, in which said first adjustment switch allows the passage of current between two first terminals thereof, and a first open position, in which said first adjustment switch prevents the passage of current between said first terminals;
wherein the command module of said control circuit is configured to actuate said first adjustment switch to switch in said first closed position at at least one value of said operating voltage, measured by said detection means, greater in absolute value than a predetermined threshold value, in order to bring said operating voltage to said threshold value.

6. Apparatus with flow-through capacitors for the purification of a liquid according to claim 5, wherein said command module actuates said first adjustment switch to switch in said first closed position with said liquid to be treated which flows through said flow-through capacitor.

7. Apparatus with flow-through capacitors for the purification of a liquid according to claim 5, wherein said command module drives said first adjustment switch to cyclically switch between said first closed position and said first open position.

8. Apparatus with flow-through capacitors for the purification of a liquid according to claim 5, wherein, at values of said operating voltage greater in absolute value than said threshold value, the switching of said first adjustment switch driven by said command module is pulsed.

9. Apparatus with flow-through capacitors for the purification of a liquid according to claim 7, wherein, at values of said operating voltage greater in absolute value than said threshold value, the switching of said first adjustment switch driven by said command module is pulsed and wherein said command module comprises a pulsed signal generator which, at values of said operating voltage greater in absolute value than said threshold value, is enabled to send to said first adjustment switch at least one sequence of control pulses that drive said first adjustment switch to cyclically switch between said first closed position and said first open position, in order to bring said operating voltage to said threshold value.

10. Apparatus with flow-through capacitors for the purification of a liquid, such apparatus comprising:
at least one cell which is provided with at least one flow-through capacitor provided with two or more electrodes facing each other, between which a liquid to be treated containing ionized particles is susceptible to flow;
an electrical power supply adapted to supply a direct current supply voltage ($V_A$);
a modulation circuit electrically connected in input to said electrical power supply in order to receive said direct current supply voltage ($V_A$), electrically connected in output to said at least one flow-through capacitor and provided with at least one switch actuatable to apply at least one operating voltage between the facing electrodes of said at least one flow-through capacitor;
a control circuit connected to said at least one switch and provided with a control module with pulse width modulation (PWM), wherein said control circuit drives the switching of said at least one switch so that said at least one switch supplies power to said facing electrodes with at least one pulsed voltage having average value proportional to said operating voltage;
wherein said cell is provided with two connection terminals and comprises at least two said flow-through capacitors, which are susceptible to be traversed by said liquid to be treated containing ionized particles and are electrically connected in series, by means of their power supply nodes, between the connection terminals of said cell;
wherein said cell comprises at least one first adjustment switch connected in parallel to the power supply nodes of each said flow-through capacitor;
wherein said control circuit is provided with:
detection means connected to the power supply nodes of each flow-through capacitor of said cell for detecting values of the operating voltage between the power supply nodes of each said flow-through capacitor,
a command module adapted to actuate said first adjustment switch to switch between a first closed position, in which said first adjustment switch allows the passage of current between two first terminals thereof, and a first open position, in which said first adjustment switch prevents the passage of current between said first terminals;
wherein the command module of said control circuit is configured to actuate said first adjustment switch to switch in said first closed position at at least one value of said operating voltage, measured by said detection means, greater in absolute value than a predetermined threshold value, in order to bring said operating voltage to said threshold value;
wherein said cell comprises at least one second adjustment switch connected in series to each corresponding said flow-through capacitor, and actuatable by said command module to switch between a second closed position, in which said second adjustment switch allows the passage of current between two second terminals thereof, and a second open position, in which said second adjustment switch prevents the passage of current between said second terminals;
said command module actuating said second adjustment switch to switch in said second open position at at least one value of said operating voltage greater in absolute value than said threshold value.

11. Apparatus with flow-through capacitors for the purification of a liquid according to claim 5, wherein each said adjustment switch comprises a semiconductor electronic device.

12. Apparatus with flow-through capacitors for the purification of a liquid according to claim 5, wherein said detection means of said control circuit comprise a processing unit adapted to calculate the average value of said pulsed voltage and to compare said pulsed voltage with said threshold value.

13. Apparatus with flow-through capacitors for the purification of a liquid according to claim 1, wherein said pulsed voltage has a frequency greater than about 100 Hz.

14. Apparatus with flow-through capacitors for the purification of a liquid according to claim 4, wherein said at least one switch of said modulation circuit comprises a metal-oxide-semiconductor field-effect transistor (MOSFET).

* * * * *